United States Patent
Abotabl et al.

(10) Patent No.: US 11,778,626 B2
(45) Date of Patent: Oct. 3, 2023

(54) CBG GROUPING AND MULTIPLE MCS BASED CBG IN DOWNLINK SINGLE DCI TRP TRANSMISSION FOR A FULL-DUPLEX UE

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/225,982

(22) Filed: Apr. 8, 2021

(65) Prior Publication Data
US 2022/0330309 A1   Oct. 13, 2022

(51) Int. Cl.
*H04W 72/00* (2023.01)
*H04W 72/23* (2023.01)
(Continued)

(52) U.S. Cl.
CPC ............ *H04W 72/23* (2023.01); *H04L 5/14* (2013.01); *H04L 27/2601* (2013.01);
(Continued)

(58) Field of Classification Search
CPC ......... H04W 72/1278; H04W 72/1289; H04W 72/1294; H04W 72/00; H04W 72/12; H04W 72/1205; H04W 72/1263; H04W 72/1275; H04L 5/00; H04L 5/14; H04L 5/1415; H04L 5/1423; H04L 27/26; H04L 27/2601; H04L 27/001; H04L 27/2617; H04L 1/0057; H04L 1/0643
See application file for complete search history.

(56) References Cited

U.S. PATENT DOCUMENTS

2013/0039349 A1*  2/2013  Ebrahimi Tazeh Mahalleh .......... H04L 5/0048
370/336
2018/0367257 A1* 12/2018  Li ......................... H04L 1/1845
(Continued)

FOREIGN PATENT DOCUMENTS

KR   WO 2021/194218   *  9/2021  ............... H04L 5/00

*Primary Examiner* — Warner Wong
(74) *Attorney, Agent, or Firm* — Procopio, Cory, Hargreaves & Savitch

(57) ABSTRACT

A UE may receive DCI from a first TRP scheduling a transmission of a TB from the first TRP and a second TRP. The UE may receive, from the first TRP a first set of CBGs of the TB in a first set of resources. The UE may receive, from the second TRP a second set of CBGs of the TB in a second set of resources that is different than the first set of resources. The first set of CBGs may be received based on a first MCS and the second set of CBGs may be received based on a second MCS. The UE may transmit, in a full-duplex mode, a message to the first TRP. The transmission to the first TRP may overlap in time with the reception from the first TRP. Accordingly, the first MCS may be lower than the second MCS.

24 Claims, 15 Drawing Sheets

(51) Int. Cl.
  *H04W 72/044*  (2023.01)
  *H04L 27/26*  (2006.01)
  *H04L 5/14*  (2006.01)
  *H04L 27/00*  (2006.01)
  *H04W 72/1263*  (2023.01)

(52) U.S. Cl.
  CPC ......... *H04W 72/044* (2013.01); *H04L 27/001* (2013.01); *H04W 72/1263* (2013.01)

(56) References Cited

U.S. PATENT DOCUMENTS

| | | | |
|---|---|---|---|
| 2019/0074929 A1* | 3/2019 | Aiba | H04L 1/0025 |
| 2019/0074937 A1* | 3/2019 | Bhattad | H04L 1/1819 |
| 2020/0059341 A1* | 2/2020 | Zhang | H04L 1/1825 |
| 2020/0067651 A1* | 2/2020 | Takeda | H04L 1/1887 |
| 2021/0345374 A1* | 11/2021 | Abotabl | H04L 5/0053 |
| 2021/0376961 A1* | 12/2021 | Shao | H04L 1/1861 |
| 2022/0217729 A1* | 7/2022 | Kim | H04W 72/1263 |
| 2022/0256573 A1* | 8/2022 | Frenne | H04W 72/1289 |
| 2022/0264608 A1* | 8/2022 | Bae | H04L 1/00 |
| 2022/0279551 A1* | 9/2022 | Liu | H04L 1/1812 |

\* cited by examiner

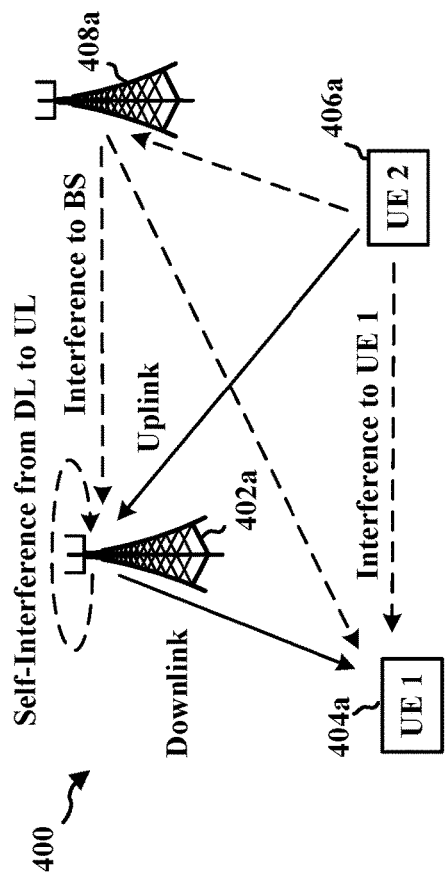
FIG. 4A
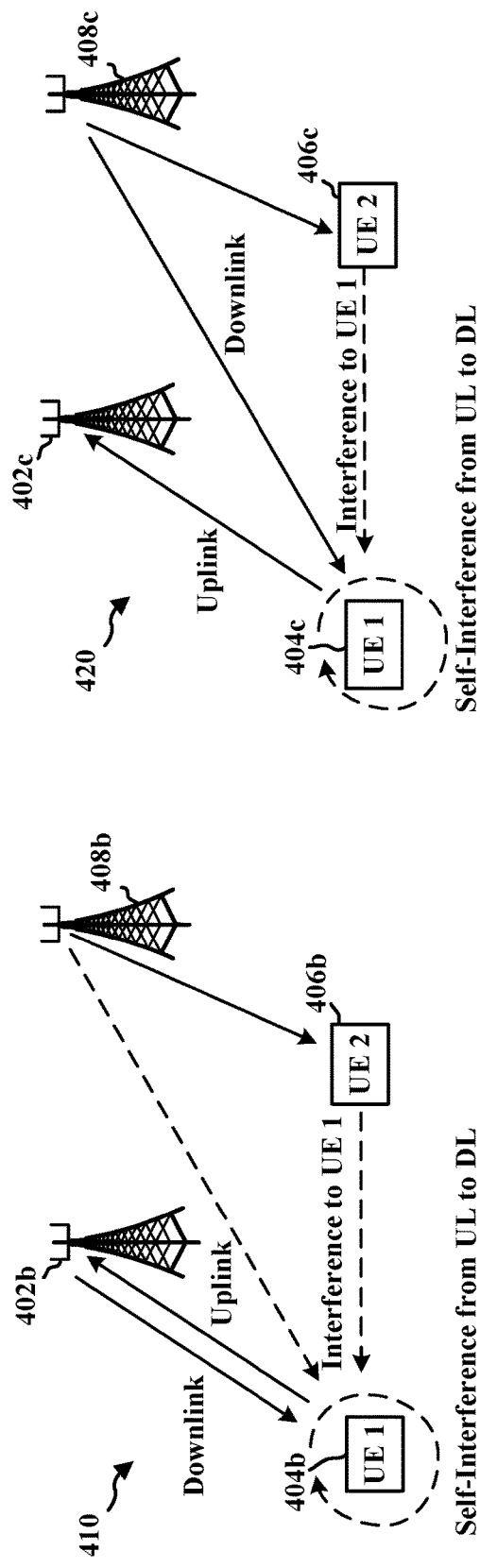
FIG. 4B
FIG. 4C

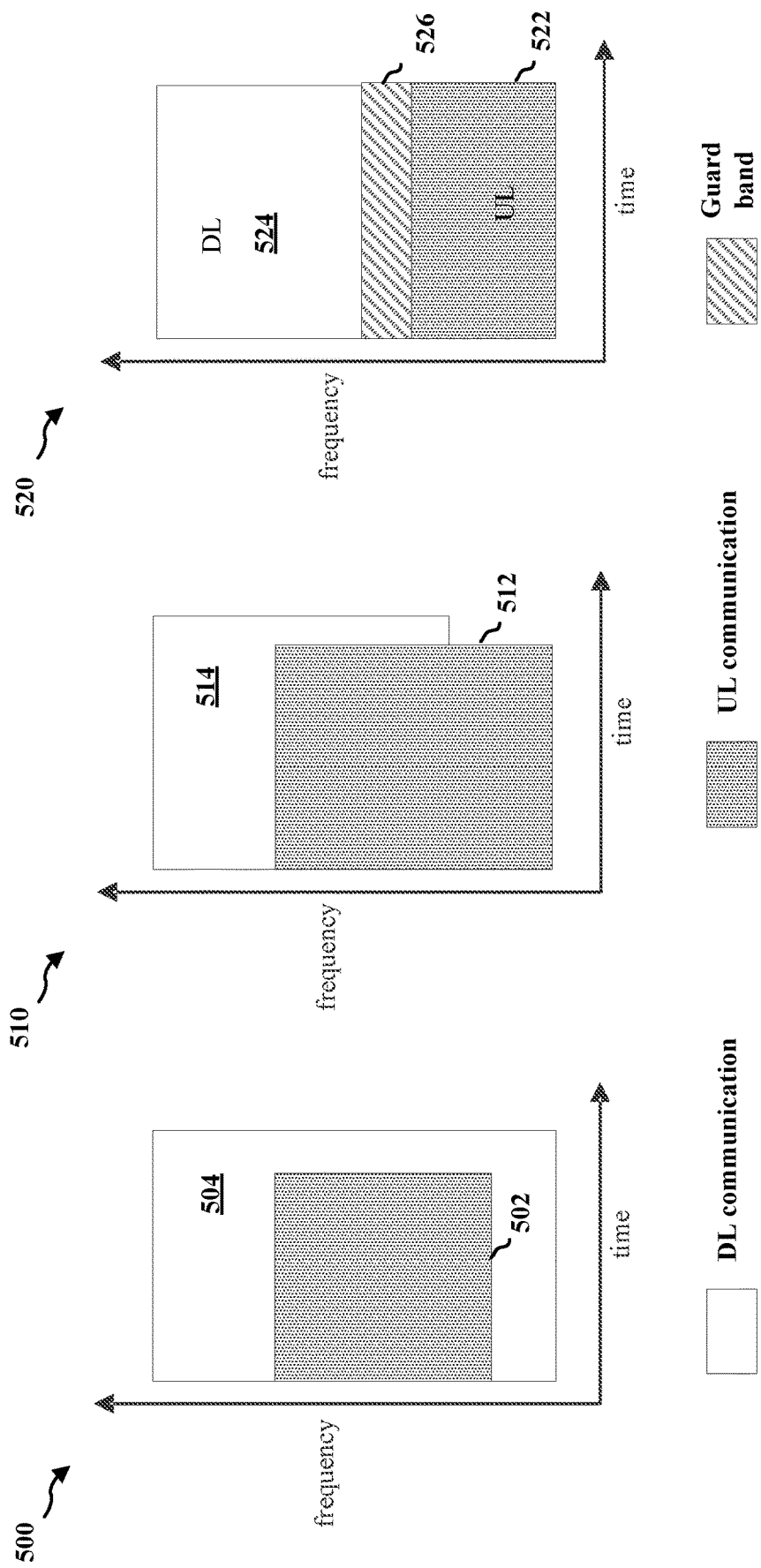

CBG GROUPING AND MULTIPLE MCS BASED CBG IN DOWNLINK SINGLE DCI TRP TRANSMISSION FOR A FULL-DUPLEX UE

BACKGROUND

Technical Field

The present disclosure relates generally to communication systems, and more particularly, to transmission of code block groups (CBGs) in a wireless communication system including multiple transmission and reception points (TRPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive downlink control information (DCI) from a first TRP scheduling a transmission of a transport block (TB) from the first TRP and a second TRP. The apparatus may receive, from the first TRP a first set of CBGs of the TB in a first set of resources. The apparatus may receive, from the second TRP a second set of CBGs of the TB in a second set of resources that is different than the first set of resources. The first set of CBGs may be received based on a first modulation and coding scheme (MCS) and the second set of CBGs may be received based on a second MCS.

In an aspect of the disclosure, a method, a computer-readable medium, and an apparatus are provided. The apparatus may be a serving cell. The apparatus may transmit, to a UE, DCI from a first TRP scheduling a transmission of a TB from the first TRP and a second TRP. The apparatus may transmit, from the first TRP to the UE, a first set of CBGs of the TB in a first set of resources. The apparatus may transmit, from the second TRP to the UE, a second set of CBGs of the TB in a second set of resources that is different than the first set of resources. The first set of CBGs may be transmitted based on a first MCS and the second set of CBGs may be transmitted based on a second MCS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, and 4C illustrate example diagrams of full duplex wireless communication.

FIGS. 5A, 5B, and 5C illustrate examples of in-band full duplex (IBFD) resources and sub-band frequency division duplex (FDD) resources for full duplex communication.

DETAILED DESCRIPTION

Figure 1:
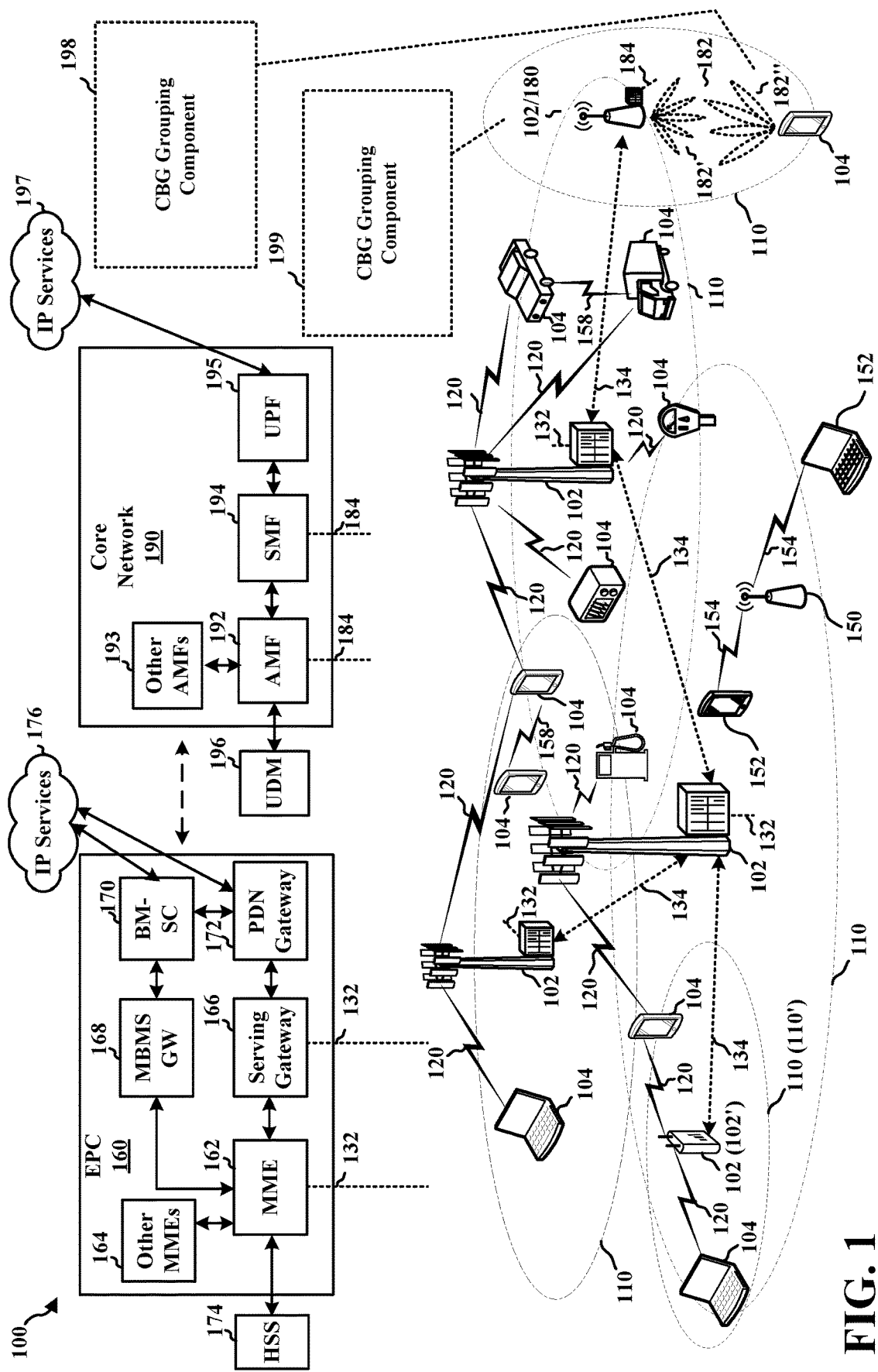
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

According to some aspects, in a multi-TRP system that schedules the physical downlink share channel (PDSCH) from the multiple TRPs in a single DCI message, each TRP may transmit a group of CBGs of the TB based on an MCS that may be different from the MCS's used for the transmission of other CBGs by the other TRPs.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a CBG grouping component 198 that may be configured to receive DCI from a first TRP scheduling a transmission of a TB from the first TRP and a second TRP. The CBG grouping component 198 may be configured to receive, from the first TRP a first set of CBGs of the TB in a first set of resources. The CBG grouping component 198 may be configured to receive, from the second TRP a second set of CBGs of the TB in a second set of resources that is different than the first set of resources. The first set of CBGs may be received based on a first MCS and the second set of CBGs may be received based on a second MCS. In certain aspects, the base station 180 may include a CBG grouping component 199 that may be configured to transmit, to a UE, DCI from a first TRP scheduling a transmission of a TB from the first TRP and a second TRP. The CBG grouping component 199 may be configured to transmit, from the first TRP to the UE, a first set of CBGs of the TB in a first set of resources. The CBG grouping component 199 may be configured to transmit, from the second TRP to the UE, a second set of CBGs of the TB in a second set of resources that is different than the first set of resources. The first set of CBGs may be transmitted based on a first MCS and the second set of CBGs may be transmitted based on a second MCS. Although the following description may be focused on 5G NR, the concepts described herein may be applicable to other similar areas, such as LTE, LTE-A, CDMA, GSM, and other wireless technologies.

Figure 2:
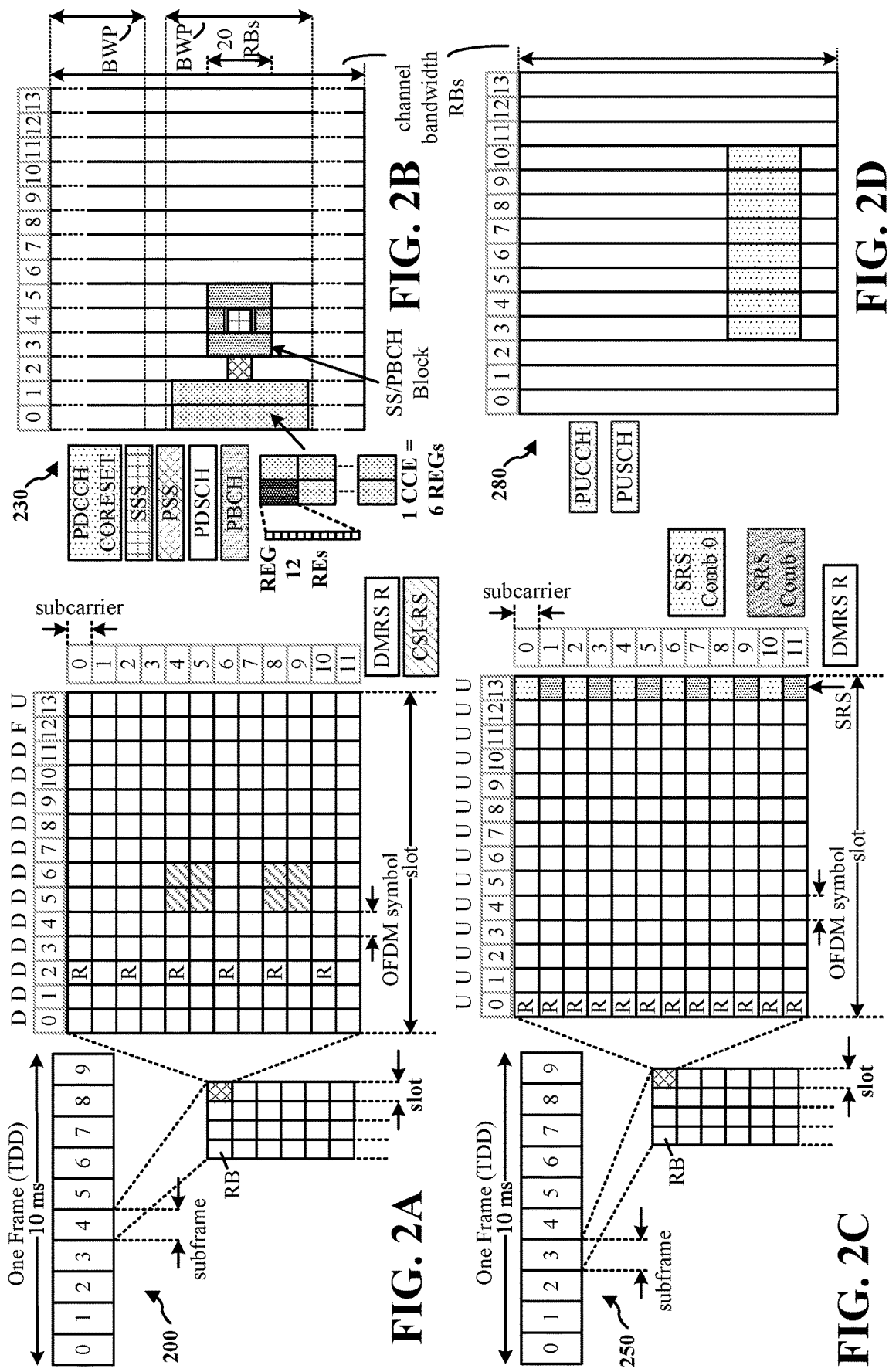
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
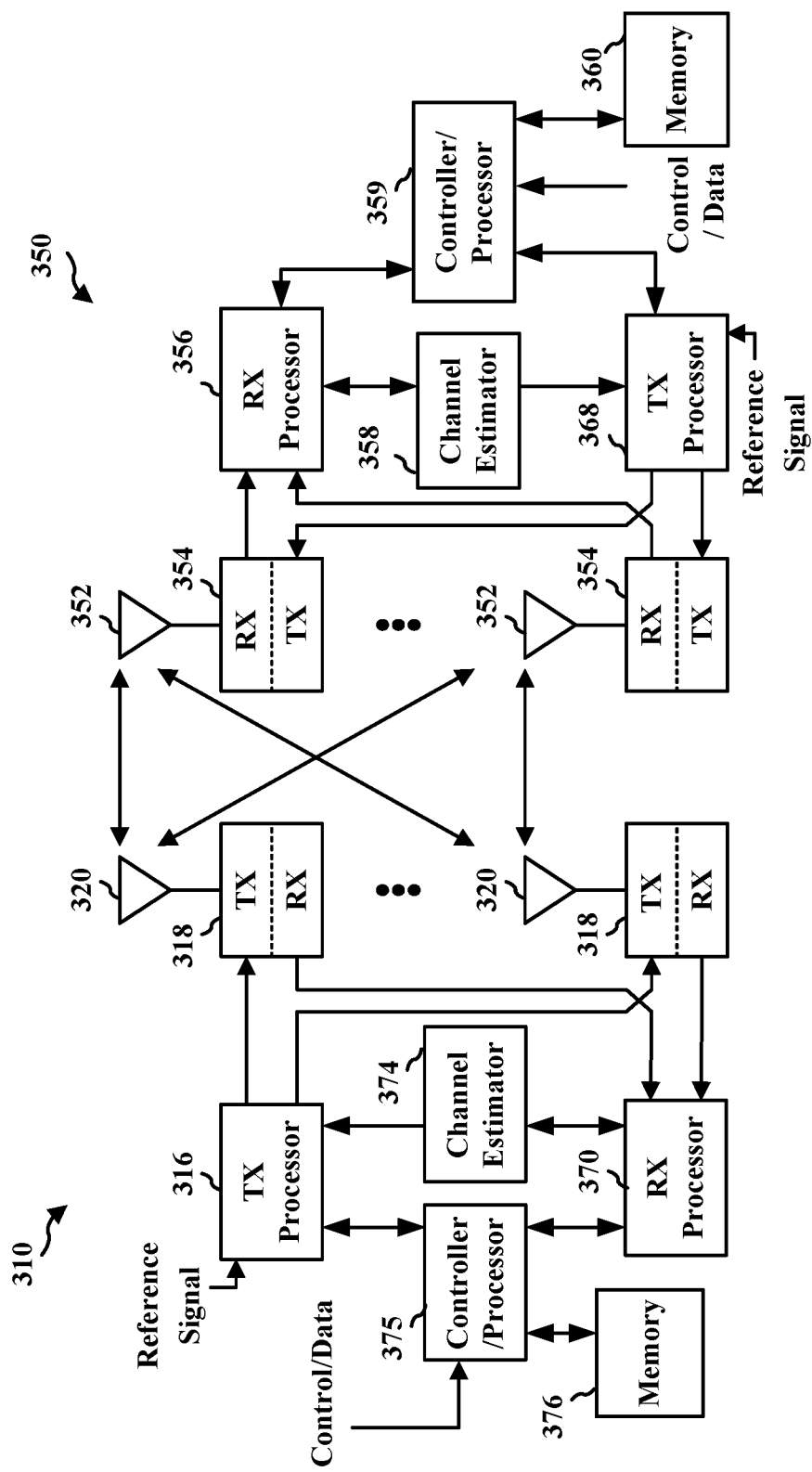
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Wireless communication systems may be configured to share available system resources and provide various telecommunication services (e.g., telephony, video, data, messaging, broadcasts, etc.) based on multiple-access technologies that support communication with multiple users.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

FIGS. 5A-5B illustrate a first example 500 and a second example 510 of in-band full duplex (IBFD) resources. FIG. 5C illustrates an example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band FDD, where uplink and downlink resources may overlap in time using different frequencies, as shown in FIG. 5C. As shown in FIG. 5C, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FDD may also be referred to as "flexible duplex".

Figure 6:
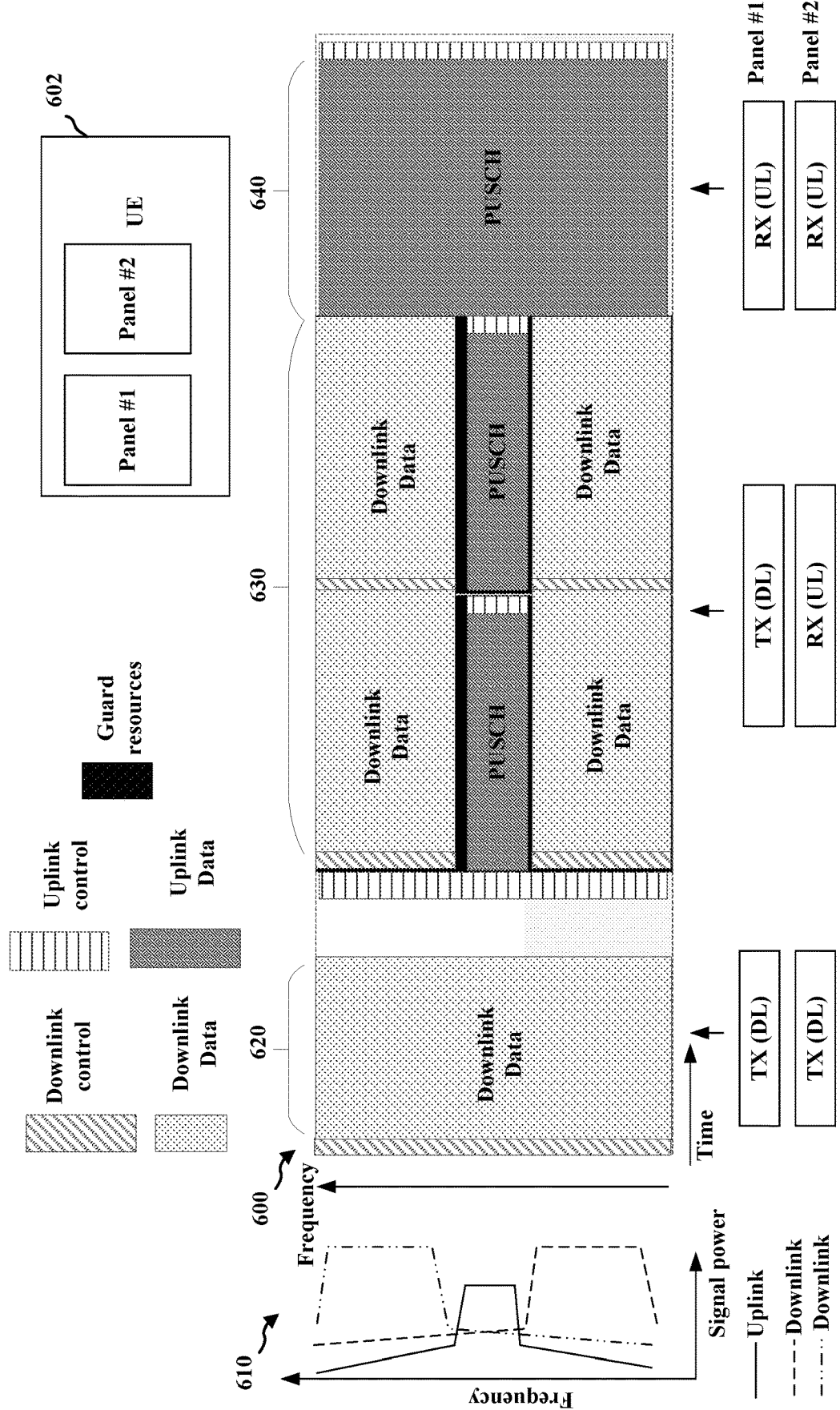
FIG. 6 illustrates an example device that includes separate panels for simultaneous transmission and reception in full-duplex operation.

Aspects presented herein help to provide self-interference mitigation. Aspects may help to improve isolation, such as greater than 50 dB. FIG. 6 illustrates an example device 602 that includes separate panels, e.g., antenna panels, for simultaneous transmission and reception in full-duplex operation. For example, the device 602 is illustrated as including panel #1 and panel #2. In some examples, panel #1 may be for downlink transmission. The downlink transmission may be at both edges of a frequency band, such as illustrated in 600 and 610. Panel #2 may be for uplink reception, such as using frequency resources within a frequency band, such as at a middle of the frequency band. Sub-band full duplex operation, such as described in connection with FIG. 5C may be associated with an isolation of greater than 40 dB. As shown in FIG. 5C, the downlink and uplink resources may be in different portions of a frequency band with a guard band between the uplink and downlink portions of the frequency band. FIG. 6 illustrates an example set of time and frequency resources 600 that include both half duplex and full duplex periods. For example, the period of time 620 includes half duplex resources for downlink data, e.g., panel #1 and panel #2 may both receive downlink data during the period 620. The period of time 620 includes sub-band full-duplex resources for uplink transmissions (e.g., PUSCH) and downlink reception (e.g., downlink data), e.g., panel #1 may receive downlink data and panel #2 may transmit PUSCH during the period 630. The period of time 640 includes half duplex resources for uplink data, e.g., panel #1 and panel #2 may both transmit PUSCH during the period 640. FIG. 6 also includes a graph 610 showing a signal power over frequency that shows that uplink and downlink signals leak outside of the frequency range provided in the sub-band full-duplex resources of period 630.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period 620 may extend for one or more symbols (e.g., downlink only symbols), the period 640 may extend for one or more symbols (e.g., uplink only symbols), and the period 630 may extend for one or more symbols (e.g., full-duplex symbols or D+U symbols).

In some examples, the receiver may perform windowed overlap and add (WOLA) to reduce the adjacent channel leakage ratio (ACLR) for the leakage of the uplink signal. An analog low pass filter (LPF) may improve an analog-to-digital conversion (ADC) dynamic range. The receiver automatic gain control (AGC) states may be improved in order to improve the noise figure (NF). Digital interference cancelation of the ACLR leakage, e.g., greater than 20 dB, may be used. In some examples, a non-linear model may be employed for each Tx-Rx pair.

Figure 7C:
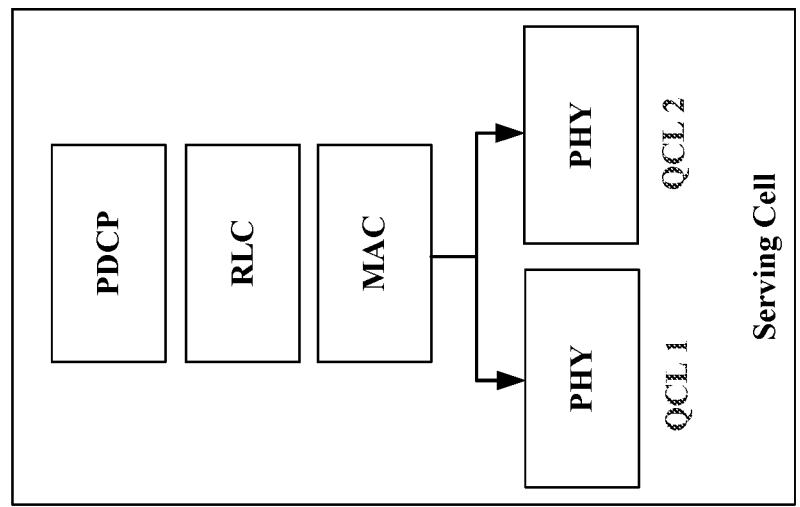
FIGS. 7A-C show diagrams illustrating the multi-TRP operation.
Figure 7A:
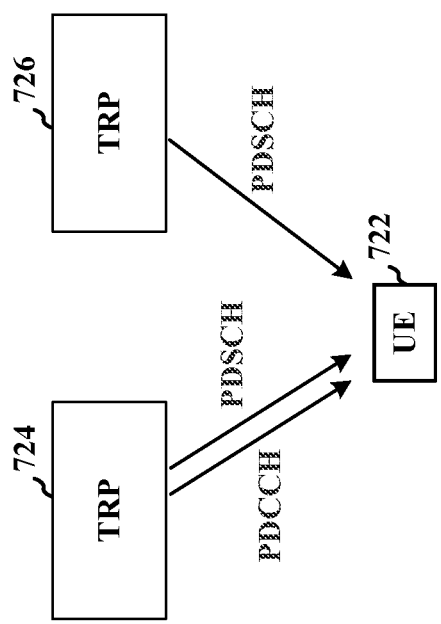
Figure 7B:
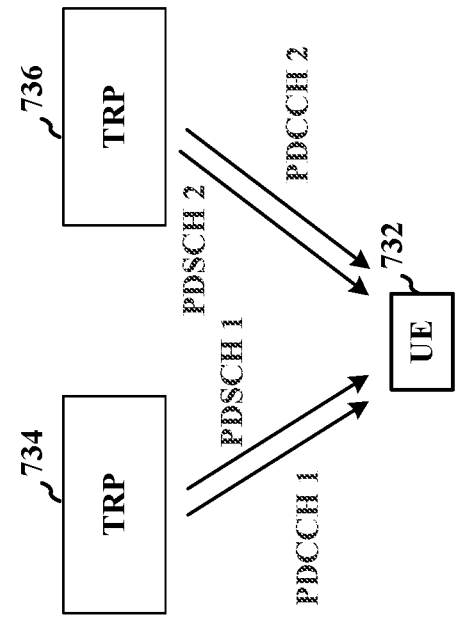

FIGS. 7A-7C include diagrams illustrating aspects of multi-TRP operation. The multi-TRP operation may be defined in a given serving cell from the UE's perspective, and the multiple TRPs may use a same physical cell identifier (PCI). The multiple TRPs in the serving cell may share the same PDCP, RLC, and MAC layers, but may have separate PHY layers and separate quasi colocation (QCL) relationships, e.g., as illustrated in the diagram 700 in FIG. 7C. The diagram 705 in FIG. 7A illustrates a single-DCI based mode, where a single DCI message transmitted via the PDCCH from the first TRP 724 to the UE 722 may schedule the PDSCH from both the first TRP 724 and the second TRP 726. The single-DCI based mode may be applicable when an ideal backhaul is present, because the PDSCH transmitted from the different TRPs may need to be synchronized. Different PDSCH schemes for robustness may be utilized. The PDSCH transmitted from the different TRPs may be spatial division multiplexed, frequency division multiplexed, or time division multiplexed.

TCI field in a single DCI, such as described in connection with FIG. 7A, can point to one or two TCI states. A MAC-CE from the base station may provide mapping information to the UE for active TCI states to DCI codepoints. The MAC-CE may activate TCI states and may map 1 or 2 of the active TCI states to a TCI codepoint. Thus, a DCI may indicate 1 or 2 of the active TCI states by referencing the TCI codepoint that is mapped/activated in the MAC-CE.

The diagram 710 in FIG. 7B illustrates a multi-DCI based mode, where each TRP may separately schedule a respective PDSCH with a respective DCI message transmitted via a respective PDCCH. For example, a first DCI message transmitted via the first PDCCH from the first TRP 734 to the UE 732 may schedule the first PDSCH transmitted from the first TRP 734 to the UE 732, and a second DCI message transmitted via the second PDCCH from the second TRP 736 to the UE 732 may schedule the second PDSCH transmitted from the second TRP 736 to the UE 732. The multi-DCI based mode may be applicable with either an ideal backhaul or a non-ideal backhaul. The carrier aggregation (CA) framework may be leveraged to treat different TRPs as different virtual component carriers (CCs) from the UE capability perspective. The UE 732 may differentiate the TRPs, based on least in part, on a control resource set (CORESET) pool index. Each CORESET, e.g., up to a maximum of 5 CORESETs, may be configured with a value of a CORESET pool index. The value of the CORESET pool index may be 0 or 1, for example. The index may group the CORESETs into two groups, e.g., for the two TRPs. For example, the UE may be configured by a higher layer parameters, such as a PDCCH configuration, that contains multiple (e.g., two) different values of CORESET pool index in the CORESETs for the active BWP of a serving cell. As an example to illustrate the concept, the UE may receive a configuration of CORESET ID=1 having CORESET pool index=0; CORESET ID=2 having CORESET pool index=0; CORESET ID=3 having CORESET pool index=1; and CORESET ID=4 having CORESET pool index=1. CORESET pool index=0 may be associated with TRP 734, and CORESET pool index=1 may be associated with TRP 736. Thus, the UE may determine that DCI received in CORESET ID=1 or 2 is from TRP 734 and DCI received in CORESET ID=3 or 4 is from TRP 736.

Figure 8:
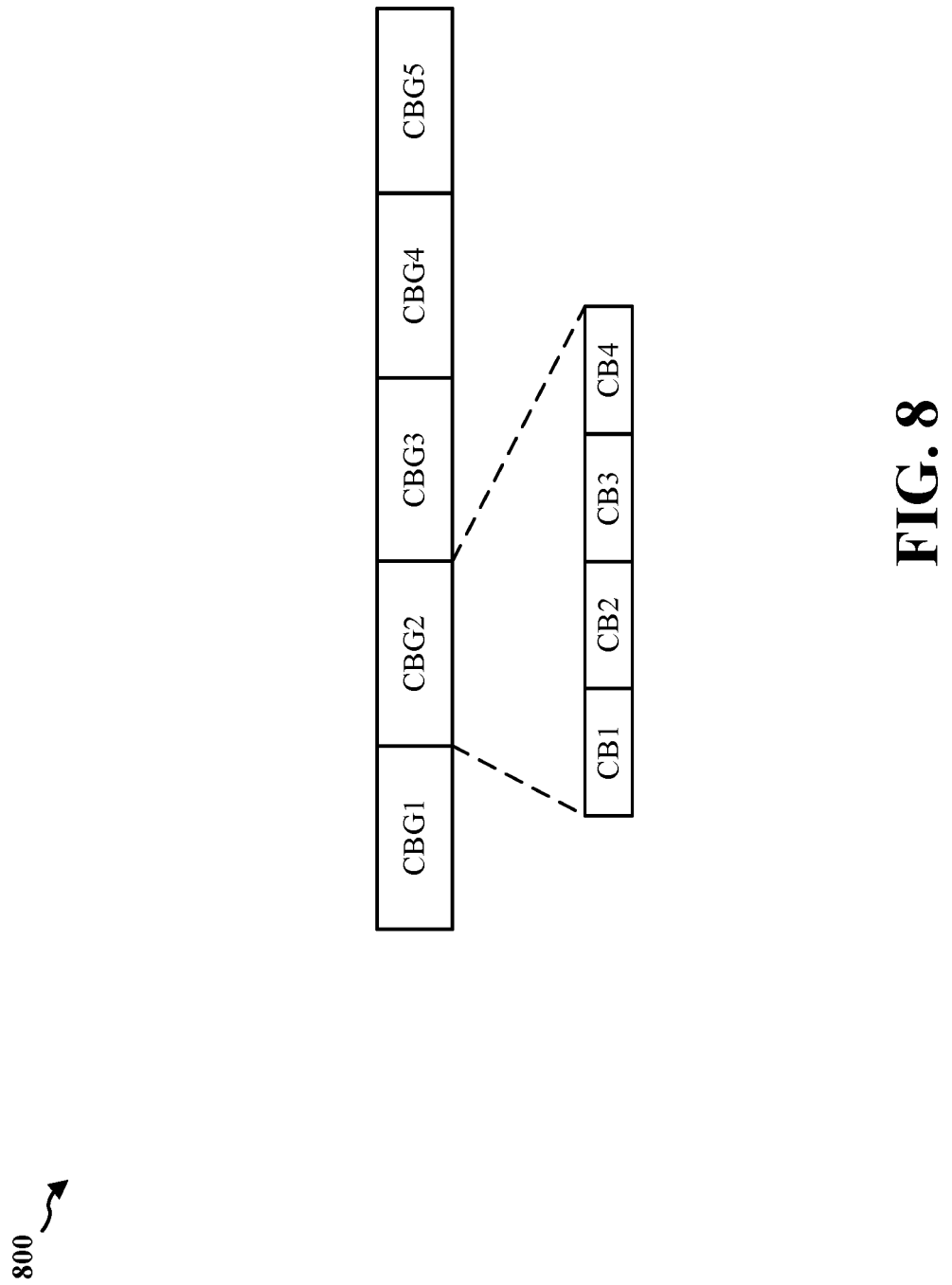
FIG. 8 is a diagram illustrating a TB including multiple CBGs.

FIG. 8 is a diagram 800 illustrating a TB including multiple CBGs. A TB may include multiple CBs. If a single ACK/NACK feedback is provided for the entire TB, in case one of the CBs is received in the downlink in error, the UE may report a NACK feedback for the entire TB, and the whole TB may be retransmitted. On the other hand, for higher HARQ efficiency, the CBs of the TB may be grouped into CBGs, as illustrated in FIG. 8. For example, as illustrated, CB1 through CB 4 may be grouped into CBG2. An ACK/NACK feedback may be provided for each CBG. Thus, if one of the CBs is received in the downlink in error, the UE may report a NACK feedback for the CBG where the error occurred, and that CBG may be retransmitted by the base station. In other words, the amount of data that is retransmitted may be reduced by providing feedback for the CBGs rather than the TB.

Figure 9:
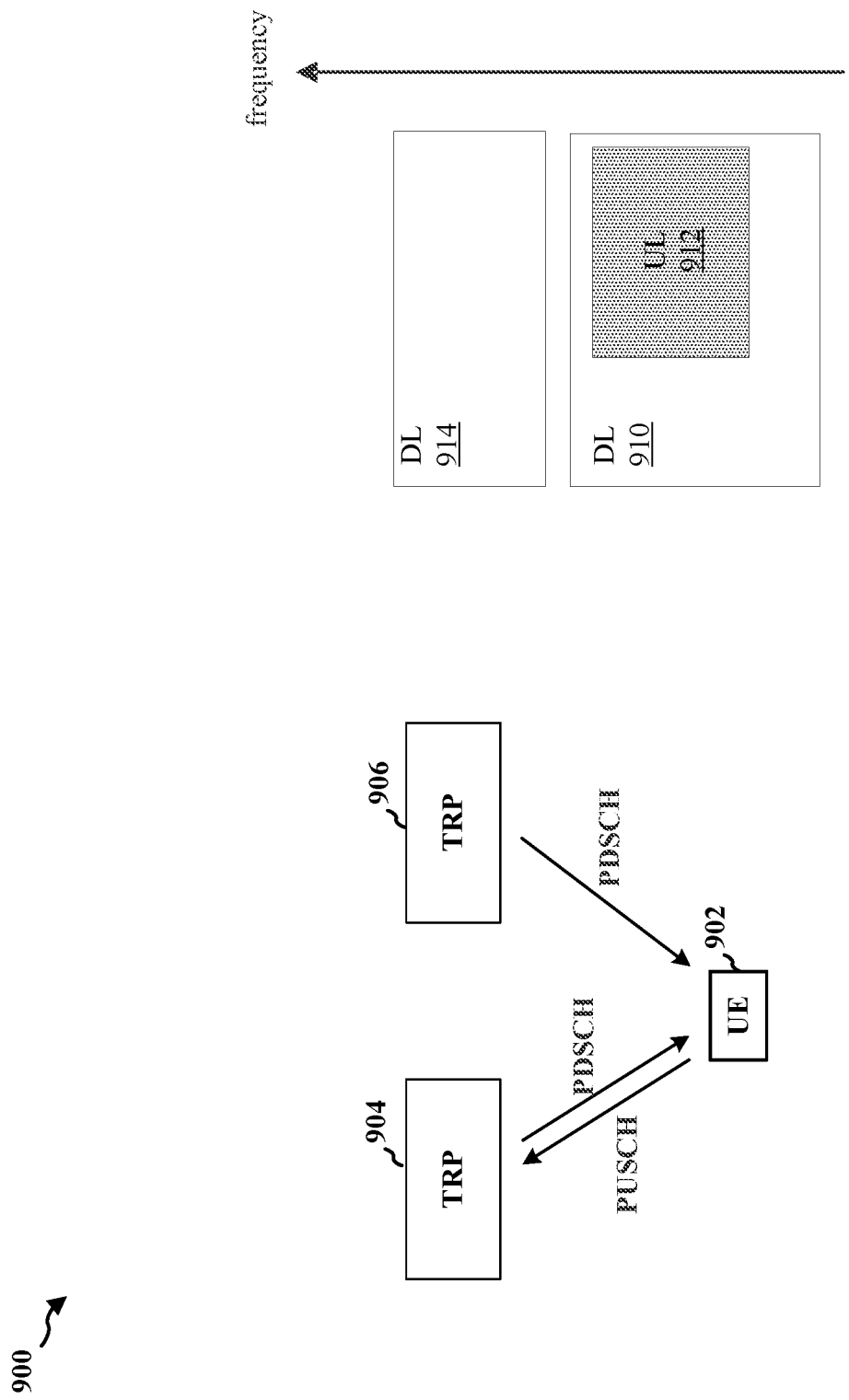
FIG. 9 is a diagram illustrating the single-DCI based multi-TRP operation.

FIG. 9 is a diagram 900 illustrating the single-DCI based multi-TRP operation. A single DCI message may schedule the PDSCH from the multiple TRPs including the first TRP 904 and the second TRP 906 in the serving cell of the UE 902. The full-duplex UE 902 may transmit an uplink transmission (e.g., a PUSCH transmission) to one of the TRPs (e.g., the first TRP 904). The PDSCH transmitted from the first TRP 904 to the UE 902 may be mapped to the resources 910, and the PDSCH transmitted from the second TRP 906 to the UE 902 may be mapped to the resources 914. Further, the PUSCH transmitted from the UE 902 to the first TRP 904 may be mapped to the resources 912. As the resources 910 and the resources 912 partially overlap, this directed uplink transmission may cause self-interference on the downlink reception from the TRP receiving the uplink transmission (e.g., the first TRP 904). This may lead to a large difference in the downlink channel quality between the two TRPs. If both TRPs transmit CBGs with the same MCS, inefficiencies in the utilization of the different channels may occur as the result of the full-duplex operation of one of the TRPs.

According to some aspects, in a multi-TRP system that schedules the PDSCH from the multiple TRPs in a single DCI message, each TRP may transmit a group of CBGs of the TB based on a respective MCS that may be different from the MCS's used for the transmission of other CBGs by the other TRPs. In particular, a lower MCS may be utilized for the transmission of CBGs from a TRP experiencing self-interference at the UE due to the full-duplex operation, and higher MCS's may be utilized for the other TRP(s). Herein a lower or smaller MCS may refer to an MCS with a lower code rate and thus higher redundancy, and a higher or larger MCS may refer to an MCS with a higher code rate and thus lower redundancy. A transmission based on a lower or smaller MCS may be easier to decode than a transmission based on a higher or larger MCS.

Figure 10:
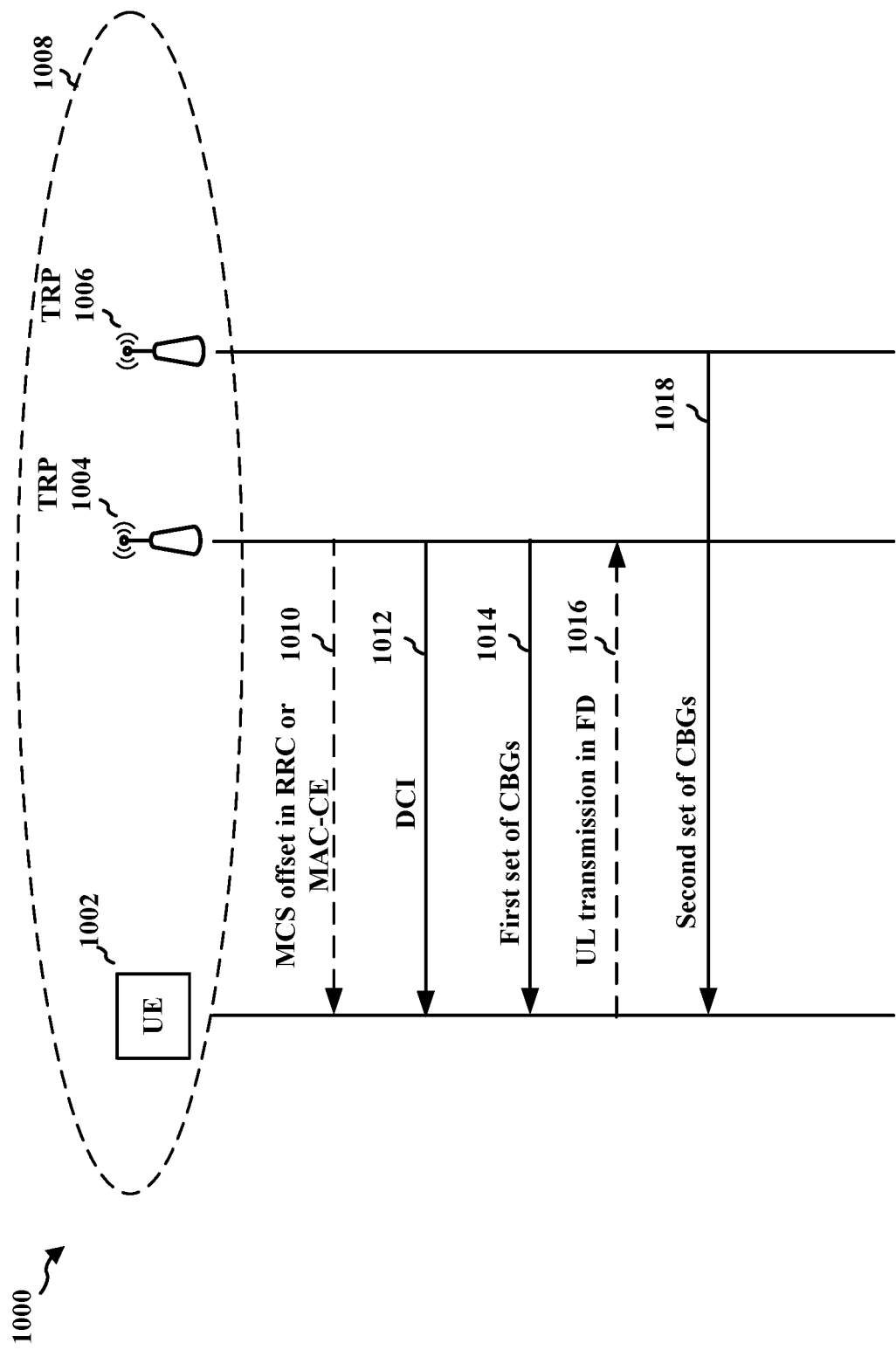
FIG. 10 is a communication flow of a wireless communication system.
Figure 11:
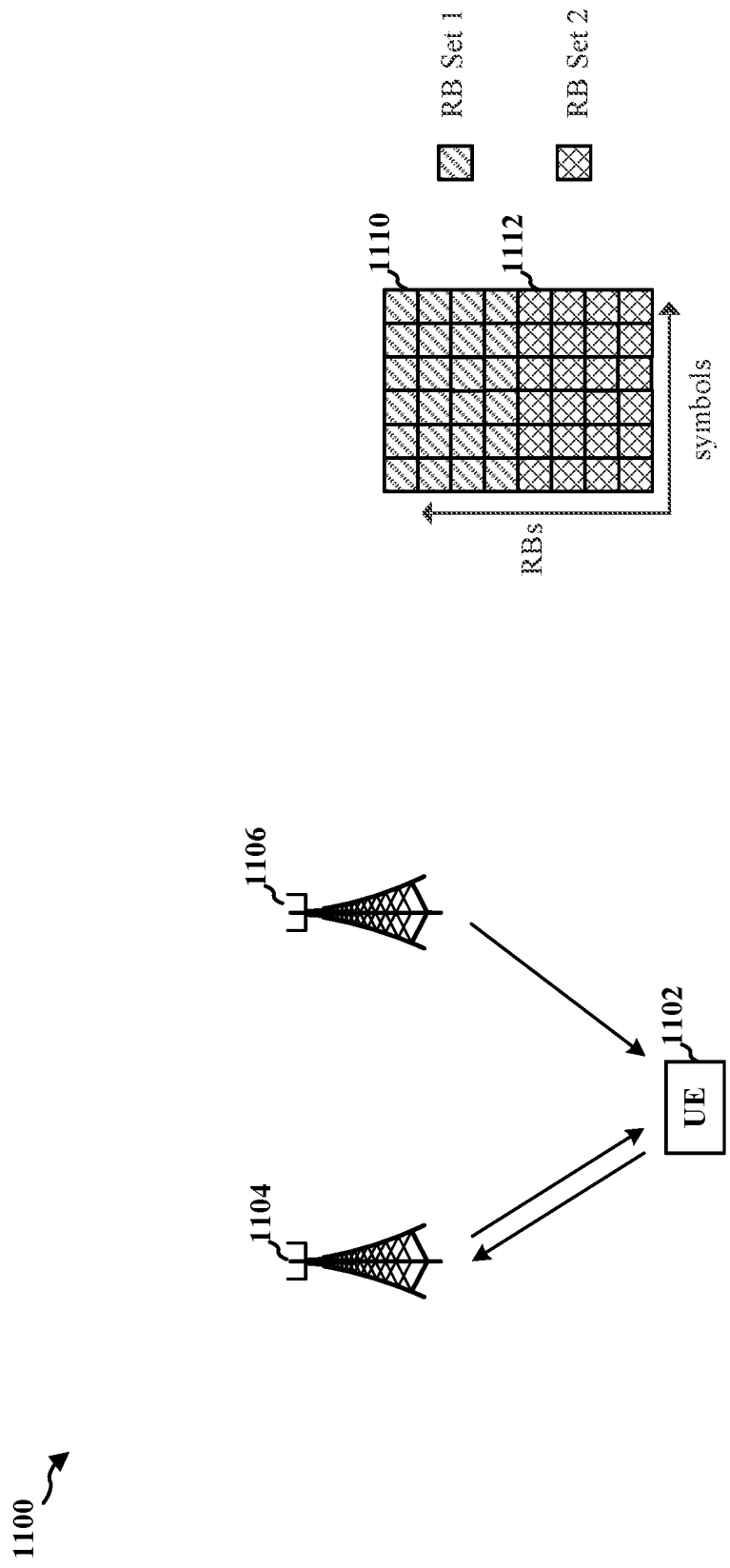
FIG. 11 is a diagram illustrating a wireless communication system.

FIG. 10 is a communication flow 1000 of a wireless communication system. The UE 1002 may correspond the UE 104/350. The serving cell 1008, which includes the first TRP 1004 and the second TRP 1006, may correspond to the base station/serving cell 102/180/310. FIG. 11 is a diagram 1100 illustrating a wireless communication system. The communication flow 1000 may be implemented at the wireless communication system of FIG. 11. The UE 1102 may correspond to the UE 1002. The first TRP 1104 may correspond to the first TRP 1004, and the second TRP 1106 may correspond to the second TRP 1006. It should be appreciated that although some aspects are described in relation to an example system including two TRPs, the aspects may be adapted for systems including more than two TRPs as well.

At 1012, the UE 1002/1102 may receive DCI from a first TRP 1004/1104 scheduling a transmission of a TB from the first TRP 1004/1104 and a second TRP 1006/1106. In other words, the serving cell 1008 may transmit, to a UE 1002/1102, DCI from a first TRP 1004/1104 scheduling a transmission of a TB from the first TRP 1004/1104 and a second TRP 1006/1106.

The TB may be mapped into two groups (sets) of CBGs, where each group of CBGs may be transmitted from a respective one of the TRPs. In general, in a system that includes n TRPs, the TB may be mapped into n groups (sets) of CBGs, where each group of CBGs may correspond to one of the TRPs, and may be transmitted from the corresponding TRP.

At 1014, the UE 1002/1102 may receive, from the first TRP 1004/1104 a first set of CBGs of the TB in a first set of resources 1110 (e.g., the RB Set 1). In other words, the serving cell 1008 may transmit, from the first TRP 1004/1104 to the UE 1002/1102, a first set of CBGs of the TB in a first set of resources 1110.

At 1018, the UE 1002/1102 may receive, from the second TRP 1006/1106 a second set of CBGs of the TB in a second set of resources 1112 (e.g., the RB Set 2) that is different than the first set of resources 1110. The first set of CBGs may be received based on a first MCS and the second set of CBGs may be received based on a second MCS. In other words, the serving cell 1008 may transmit, from the second TRP 1006/1106 to the UE 1002/1102, a second set of CBGs of the TB in a second set of resources 1112 that is different than the first set of resources 1110. The first set of CBGs may be transmitted based on a first MCS and the second set of CBGs may be transmitted based on a second MCS.

The first set of resources 1110 and the second set of resources 1112 may be frequency division multiplexed. The mapping of the TB across the time and frequency resources may be performed on a per CBG group (set) basis. In particular, the first group (set) of CBGs may be mapped first in frequency then in time in the time and frequency resources 1110 allocated to the first TRP 1004/1104, and the second group (set) of CBGs may be mapped first in frequency then in time in the time and frequency resources 1112 allocated to the second TRP 1006/1106.

In one configuration, each CBG group (set) may be transmitted with a respective MCS that may be accommodated by the respective channel from the respective TRP to the UE. In particular, the first set of CBGs may be transmitted and received based on a first MCS and the second set of CBGs may be transmitted and received based on a second MCS. The first MCS may be different from the second MCS.

In one configuration, the UE 1002/1102 may receive two MCS values in the scheduling DCI at 1012, one for each TRP such that the first set of CBGs of the first TRP 1004/1104 may be transmitted with the first signaled MCS value and the second set of CBGs of the second TRP 1006/1106 may be transmitted with second signaled MCS value. In other words, the DCI transmitted at 1012 may include a first indication of the first MCS and a second indication of the second MCS.

In one configuration, the DCI transmitted at 1012 may include a single MCS value (i.e., the DCI may include a single MCS indication), and the transmission at 1014 of the first set of CBGs from the first TRP 1004/1104 and the transmission at 1018 of the second set of CBGs from the second TRP 1006/1106 may be based on the same indicated MCS.

In one configuration, the DCI transmitted at 1012 may include a single MCS value (i.e., the DCI may include a single MCS indication) in order to limit the size of the DCI. The MCS indicated in the DCI may be utilized for one of the transmission at 1014 of the first set of CBGs from the first TRP 1004/1104 or the transmission at 1018 of the second set of CBGs from the second TRP 1006/1106. Further, at 1010, the serving cell 1008 (e.g., through the first TRP 1004/1104) may transmit to the UE 1002/1102, and the UE 1002/1102 may receive from the serving cell 1008, a configuration of an offset in RRC signaling or in a media access control (MAC)-control element (CE) (MAC-CE). Thus, the other of the transmission at 1014 of the first set of CBGs from the first TRP 1004/1104 or the transmission at 1018 of the second set of CBGs from the second TRP 1006/1106 may be based on an MCS that is determined based on the MCS indicated in the DCI and the configured offset. For example, if the DCI indicates an MCS index 4, and the MCS index 4 is utilized for the transmission at 1014 of the first set of CBGs from the first TRP 1004/1104, and if the configured offset is −2, then the MCS index 2 (=4-2) may be utilized for the transmission at 1018 of the second set of CBGs from the second TRP 1006/1106.

In one configuration, at 1016, a full-duplex UE 1002/1102 may transmit an uplink message (e.g., via a PUSCH) to one of the TRPs (e.g., the first TRP 1004/1104), where the transmission may overlap in time with the downlink reception from the same TRP. The CBG group (set) mapped to the same TRP receiving the uplink message may be transmitted with a lower MCS value to accommodate the self-interference at the UE. The CBG group (set) mapped to the other TRP may be transmitted with a higher MCS value. For example, if the UE 1002/1102 transmits in a full-duplex mode an uplink message to the first TRP 1104/1104, where the transmission of the uplink message overlaps in time with the transmission at 1014 from the first TRP 1104/1104, the transmission at 1014 from the first TRP 1104/1104 to the UE 1002/1102 may be based on a lower MCS to accommodate the self-interference, and the transmission at 1018 from the second TRP 1106/1106 to the UE 1002/1102 may be based on a higher MCS. In other words, if the UE 1002/1102 transmits in a full-duplex mode an uplink message to the first TRP 1104/1104, where the transmission of the uplink message overlaps in time with the transmission at 1014 from the first TRP 1104/1104, then the first MCS may be lower than the second MCS. In one configuration, the DCI transmitted at 1012 may include a first indication of the first MCS and a second indication of the second MCS. In another configuration, the DCI transmitted at 1012 may include one of a first indication of the first MCS or a second indication of the second MCS, and the other of the first MCS or the second MCS may be determined based on the MCS indicated in the DCI and an offset configured with either RRC signaling or a MAC-CE.

In one configuration, the transport block size (TBS) may be calculated based on the MCS and the available time and frequency allocations allocated for the transmission. In case of CBG grouping and variable MCS's, the TBS may be calculated over two steps: In the first step, the partial TB size of each of the groups (sets) may be calculated, and in the second step, the total TBS may be determined by the addition of the partial TB sizes.

Therefore, in the illustrated example system including the first TRP 1004/1104 and the second TRP 1006/1106 where the TB is mapped to two groups (sets), the TBS of the TB may be based at least in part on first time-frequency resources 1110 associated with the first TRP 1104/1104, second time-frequency resources 1112 associated with the second TRP 1006/1106, the first MCS, and the second MCS. In particular, the TB S of the TB may be based on a sum of a first size of the first set of CBGs and a second size of the second set of CBGs. The first size may be determined based at least in part on the first time-frequency resources 1110 associated with the first TRP 1004/1104 and the first MCS. The second size may be determined based at least in part on the second time-frequency resources 1112 associated with the second TRP 1006/1106 and the second MCS.

Figure 12:
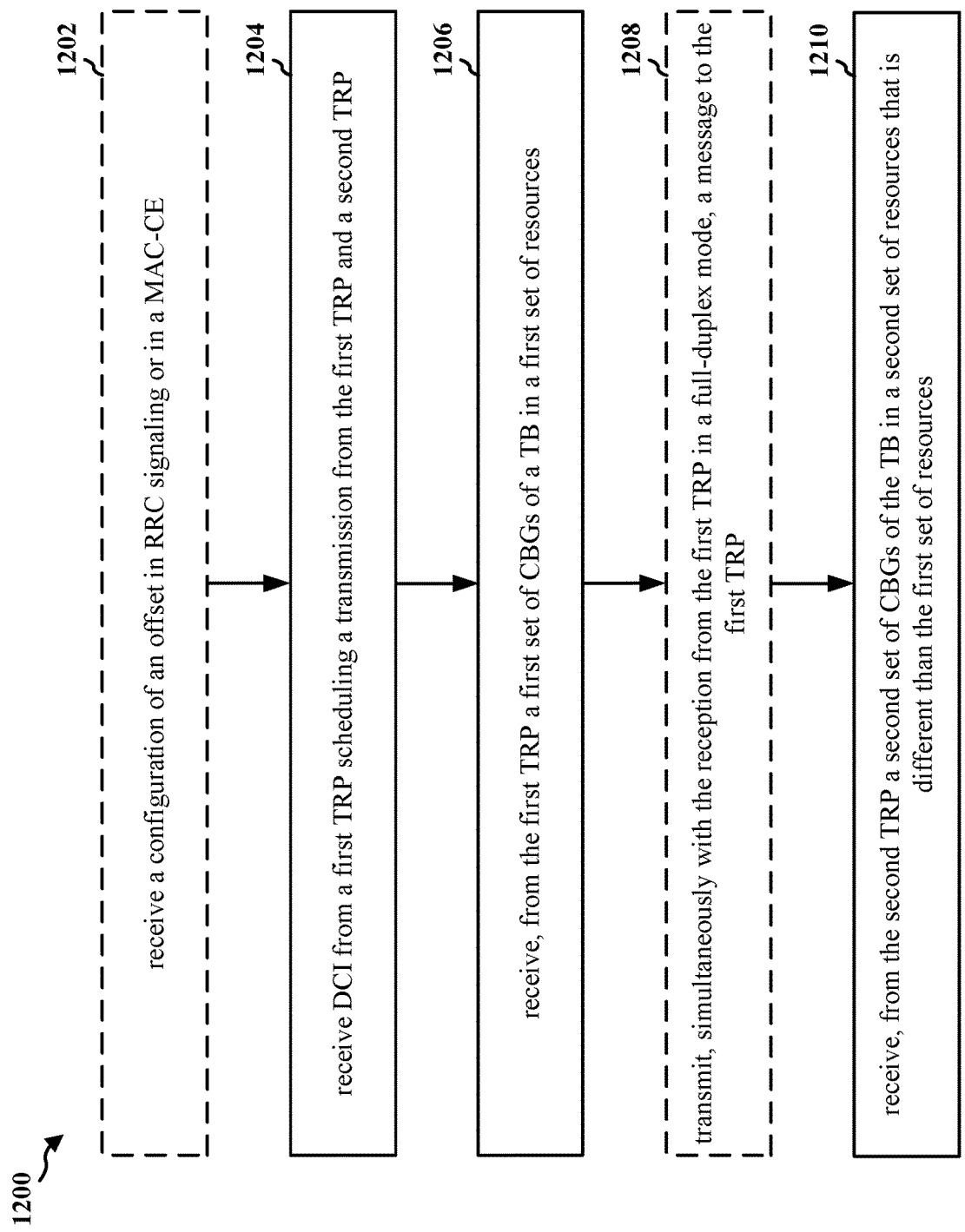
FIG. 12 is a flowchart of a method of wireless communication.

FIG. 12 is a flowchart 1200 of a method of wireless communication. The method may be performed by a UE (e.g., the UE 104; the UE 350; the UE 1002/1102; the apparatus 1402). Optional aspects are illustrated with a dashed line. The method may improve the effectiveness of wireless communication for a UE with multiple TRPs.

At 1204, the UE may receive DCI from a first TRP scheduling a transmission of a TB from the first TRP and a second TRP. For example, 1204 may be performed by the DCI component 1442 in FIG. 14. Referring to FIGS. 10 and 11, at 1012, the UE 1002/1102 may receive DCI from a first TRP 1004/1104 scheduling a transmission of a TB from the first TRP 1004/1104 and a second TRP 1008/1108.

At 1206, the UE may receive, from the first TRP a first set of CBGs of the TB in a first set of resources. For example, 1206 may be performed by the first TRP component 1444 in FIG. 14. Referring to FIGS. 10 and 11, at 1014, the UE 1002/1102 may receive, from the first TRP 1004/1104 a first set of CBGs of the TB in a first set of resources 1110.

At 1210, the UE may receive, from the second TRP a second set of CBGs of the TB in a second set of resources that is different than the first set of resources. The first set of CBGs may be received based on a first MCS and the second set of CBGs may be received based on a second MCS. For example, 1210 may be performed by the second TRP component 1448 in FIG. 14. Referring to FIGS. 10 and 11, at 1018, the UE 1002/1102 may receive, from the second TRP 1006/1106 a second set of CBGs of the TB in a second set of resources 1112 that is different than the first set of resources 1110.

In one configuration, the first set of resources and the second set of resources may be frequency division multiplexed. Referring to FIGS. 10 and 11, the first set of resources 1110 and the second set of resources 1112 may be frequency division multiplexed.

In one configuration, the first set of CBGs may be mapped to first time-frequency resources associated with the first TRP, and the second set of CBGs may be mapped to second time-frequency resources associated with the second TRP. Referring to FIGS. 10 and 11, the first set of CBGs may be mapped to first time-frequency resources 1110 associated with the first TRP 1004/1104, and the second set of CBGs may be mapped to second time-frequency resources 1112 associated with the second TRP 1006/1106.

In one configuration, the first set of CBGs may be mapped first in frequency then in time in the first time-frequency resources associated with the first TRP, and the second set of CBGs may be mapped first in frequency then in time in the second time-frequency resources associated with the second TRP. Referring to FIGS. 10 and 11, the first set of CBGs may be mapped first in frequency then in time in the first time-frequency resources 1110 associated with the first TRP 1004/1104, and the second set of CBGs may be mapped first in frequency then in time in the second time-frequency resources 1112 associated with the second TRP 1006/1106.

In one configuration, the DCI may include a first indication of the first MCS and a second indication of the second MCS.

In one configuration, the DCI may include an indication of the first MCS. At 1202. the UE may receive a configuration of an offset in RRC signaling or in a MAC-CE. The second MCS may be based on the indication and the offset. For example, 1202 may be performed by the offset component 1440 in FIG. 14. Referring to FIGS. 10 and 11, the UE 1002/1102 may receive a configuration of an offset in RRC signaling or in a MAC-CE.

In one configuration, at 1208, the UE may transmit, in a full-duplex mode, a message to the first TRP. The transmission of the message to the first TRP may overlap in time with the reception of the first set of CBGs from the first TRP. The first MCS may be lower than the second MCS. For example, 1208 may be performed by the FD component 1446 in FIG. 14. Referring to FIGS. 10 and 11, the UE 1002/1102 may transmit, in a full-duplex mode, a message to the first TRP 1004/1104.

In one configuration, the second MCS may have a same value as the first MCS if the DCI includes a single MCS indication.

In one configuration, a TBS of the TB may be based at least in part on first time-frequency resources associated with the first TRP, second time-frequency resources associated with the second TRP, the first MCS, and the second MCS. Referring to FIGS. 10 and 11, a TBS of the TB may be based at least in part on first time-frequency resources 1110 associated with the first TRP 1004/1104, second time-frequency resources 1112 associated with the second TRP 1006/1106, the first MCS, and the second MCS.

In one configuration, the TBS of the TB may be based on a first size of the first set of CBGs and a second size of the second set of CBGs. The first size may be determined based at least in part on the first time-frequency resources associated with the first TRP and the first MCS. The second size may be determined based at least in part on the second time-frequency resources associated with the second TRP and the second MCS. Referring to FIGS. 10 and 11, the TBS of the TB may be based on a first size of the first set of CBGs and a second size of the second set of CBGs. The first size may be determined based at least in part on the first time-frequency resources 1110 associated with the first TRP 1004/1104 and the first MCS. The second size may be determined based at least in part on the second time-frequency resources 1112 associated with the second TRP 1006/1106 and the second MCS.

Figure 13:
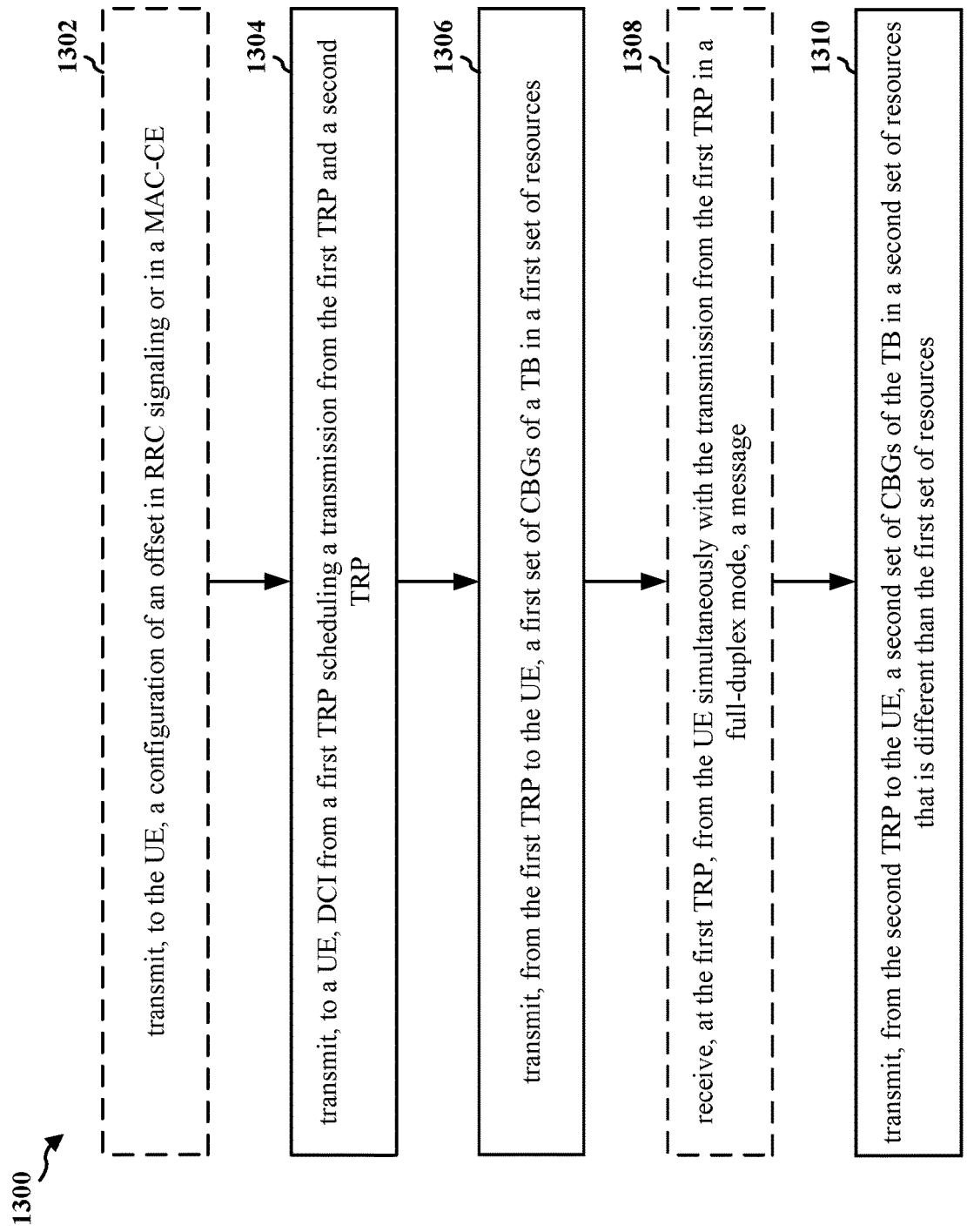
FIG. 13 is a flowchart of a method of wireless communication.

FIG. 13 is a flowchart 1300 of a method of wireless communication. The method may be performed by a serving cell (e.g., the base station/serving cell 102/180; the base station/serving cell 310; the serving cell 1008 including the first TRP 1004/1104 and the second TRP 1006/1106; the apparatus 1502). At 1304, the serving cell may transmit, to a UE, DCI from a first TRP scheduling a transmission of a TB from the first TRP and a second TRP. For example, 1304 may be performed by the DCI component 1542 in FIG. 15. Referring to FIGS. 10 and 11, at 1012, the serving cell 1008 may transmit, to a UE 1002/1102, DCI from a first TRP 1004/1104 scheduling a transmission of a TB from the first TRP 1004/1104 and a second TRP 1006/1106.

At 1306, the serving cell may transmit, from the first TRP to the UE, a first set of CBGs of the TB in a first set of resources. For example, 1306 may be performed by the first TRP component 1544 in FIG. 15. Referring to FIGS. 10 and 11, at 1014, the serving cell 1008 may transmit, from the first TRP 1004/1104 to the UE 1002/1102, a first set of CBGs of the TB in a first set of resources 1110.

At 1310, the serving cell may transmit, from the second TRP to the UE, a second set of CBGs of the TB in a second set of resources that is different than the first set of resources. The first set of CBGs may be transmitted based on a first MCS and the second set of CBGs may be transmitted based on a second MCS. For example, 1310 may be performed by the second TRP component 1548 in FIG. 15. Referring to FIGS. 10 and 11, at 1018, the serving cell 1008 may transmit, from the second TRP 1006/1106 to the UE 1002/1102, a second set of CBGs of the TB in a second set of resources 1112 that is different than the first set of resources 1110.

In one configuration, the first set of resources and the second set of resources may be frequency division multiplexed. Referring to FIGS. 10 and 11, the first set of resources 1110 and the second set of resources 1112 may be frequency division multiplexed.

In one configuration, the first set of CBGs may be mapped to first time-frequency resources associated with the first TRP, and the second set of CBGs may be mapped to second time-frequency resources associated with the second TRP. Referring to FIGS. 10 and 11, the first set of CBGs may be mapped to first time-frequency resources 1110 associated with the first TRP 1004/1104, and the second set of CBGs may be mapped to second time-frequency resources 1112 associated with the second TRP 1006/1106.

In one configuration, the first set of CBGs may be mapped first in frequency then in time in the first time-frequency resources associated with the first TRP, and the second set of CBGs may be mapped first in frequency then in time in the second time-frequency resources associated with the second TRP. FIGS. 10 and 11, the first set of CBGs may be mapped first in frequency then in time in the first time-frequency resources 1110 associated with the first TRP 1004/1104, and the second set of CBGs may be mapped first in frequency then in time in the second time-frequency resources 1112 associated with the second TRP 1006/1106.

In one configuration, the DCI may include a first indication of the first MCS and a second indication of the second MCS.

In one configuration, the DCI may include an indication of the first MCS. At 1302, the serving cell may transmit, to the UE, a configuration of an offset in RRC signaling or in a MAC-CE. The second MCS may be based on the indication and the offset. For example, 1302 may be performed by the offset component 1540 in FIG. 15. Referring to FIGS. 10 and 11, the serving cell 1008 may transmit, to the UE 1002/1102, a configuration of an offset in RRC signaling or in a MAC-CE.

In one configuration, at 1308, the serving cell may receive, at the first TRP, from the UE in a full-duplex mode, a message. The reception at the first TRP of the message from the UE may overlap in time with the transmission of the first set of CBGs from the first TRP to the UE. The first MCS may be lower than the second MCS. For example, 1308 may be performed by FD component 1546 in FIG. 15. Referring to FIGS. 10 and 11, the serving cell 1008 may receive, at the first TRP 1004/1104, from the UE 1002/1102 in a full-duplex mode, a message.

In one configuration, the second MCS may have a same value as the first MCS if the DCI includes a single MCS indication.

In one configuration, a TBS of the TB may be based at least in part on first time-frequency resources associated with the first TRP, second time-frequency resources associated with the second TRP, the first MCS, and the second MCS. Referring to FIGS. 10 and 11, a TBS of the TB may be based at least in part on first time-frequency resources 1110 associated with the first TRP 1004/1104, second time-frequency resources 1112 associated with the second TRP 1006/1106, the first MCS, and the second MCS.

In one configuration, the TBS of the TB may be based on a first size of the first set of CBGs and a second size of the second set of CBGs. The first size may be determined based at least in part on the first time-frequency resources associated with the first TRP and the first MCS. The second size may be determined based at least in part on the second time-frequency resources associated with the second TRP and the second MCS. Referring to FIGS. 10 and 11, the TBS of the TB may be based on a first size of the first set of CBGs and a second size of the second set of CBGs. The first size may be determined based at least in part on the first time-frequency resources 1110 associated with the first TRP 1004/1104 and the first MCS. The second size may be determined based at least in part on the second time-frequency resources 1112 associated with the second TRP 1006/1106 and the second MCS.

Figure 14:
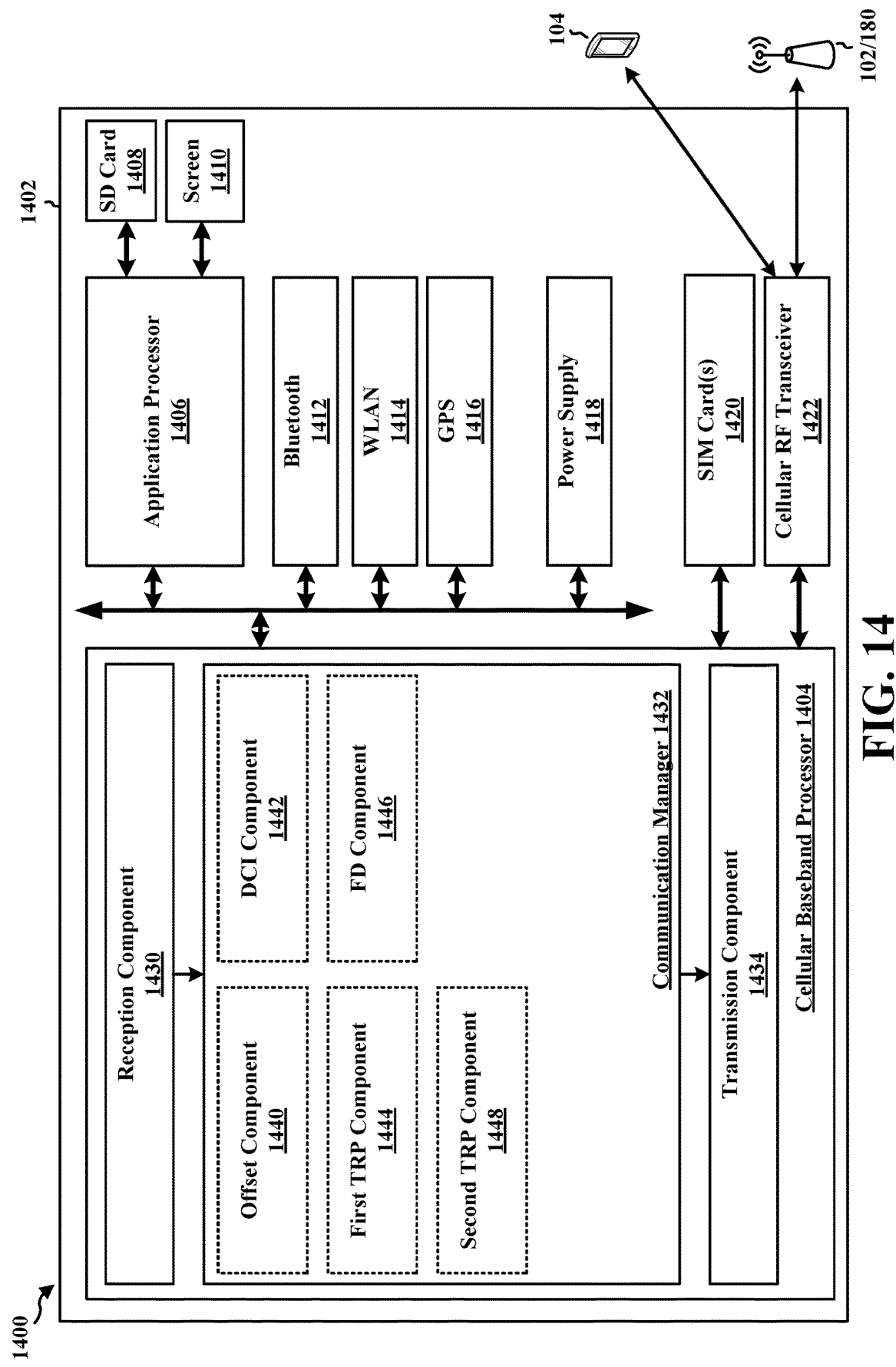
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes an offset component 1440 that may be configured to receive a configuration of an offset in RRC signaling or in a MAC-CE, e.g., as described in connection with 1202 in FIG. 12. The communication manager 1432 further includes a DCI component 1442 that may be configured to receive DCI from a first TRP scheduling a transmission of a TB from the first TRP and a second TRP, e.g., as described in connection with 1204 in FIG. 12. The communication manager 1432 further includes a first TRP component 1444 that may be configured to receive, from the first TRP a first set of CBGs of the TB in a first set of resources, e.g., as described in connection with 1206 in FIG. 12. The communication manager 1432 further includes an FD component 1446 that may be configured to transmit, in a full-duplex mode, a message to the first TRP, e.g., as described in connection with 1208 in FIG. 12. The communication manager 1432 further includes a second TRP component 1448 that may be configured to receive, from the second TRP a second set of CBGs of the TB in a second set of resources that is different than the first set of resources, e.g., as described in connection with 1210 in FIG. 12.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving DCI from a first TRP scheduling a transmission of a TB from the first TRP and a second TRP. The apparatus 1402 may include means for receiving, from the first TRP a first set of CBGs of the TB in a first set of resources. The apparatus 1402 may include means for receiving, from the second TRP a second set of CBGs of the TB in a second set of resources that is different than the first set of resources. The first set of CBGs may be received based on a first MCS and the second set of CBGs may be received based on a second MCS.

In one configuration, the first set of resources and the second set of resources may be frequency division multiplexed. In one configuration, the first set of CBGs may be mapped to first time-frequency resources associated with the first TRP, and the second set of CBGs may be mapped to second time-frequency resources associated with the second TRP. In one configuration, the first set of CBGs may be mapped first in frequency then in time in the first time-frequency resources associated with the first TRP, and the second set of CBGs may be mapped first in frequency then in time in the second time-frequency resources associated with the second TRP. In one configuration, the DCI may include a first indication of the first MCS and a second indication of the second MCS. In one configuration, the DCI may include an indication of the first MCS, and the apparatus 1402 may further include means for receiving a configuration of an offset in RRC signaling or in a MAC-CE, where the second MCS may be based on the indication and the offset. In one configuration, the apparatus 1402 may further include means for transmitting, in a full-duplex mode, a message to the first TRP, the transmission of the message to the first TRP overlapping in time with the reception of the first set of CBGs from the first TRP, where the first MCS may be lower than the second MCS. In one configuration, the second MCS may have a same value as the first MCS if the DCI includes a single MCS indication. In one configuration, a TBS of the TB may be based at least in part on first time-frequency resources associated with the first TRP, second time-frequency resources associated with the second TRP, the first MCS, and the second MCS. In one configuration, the TBS of the TB may be based on a first size of the first set of CBGs and a second size of the second set of CBGs, the first size being determined based at least in part on the first time-frequency resources associated with the first TRP and the first MCS, the second size being determined based at least in part on the second time-frequency resources associated with the second TRP and the second MCS.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
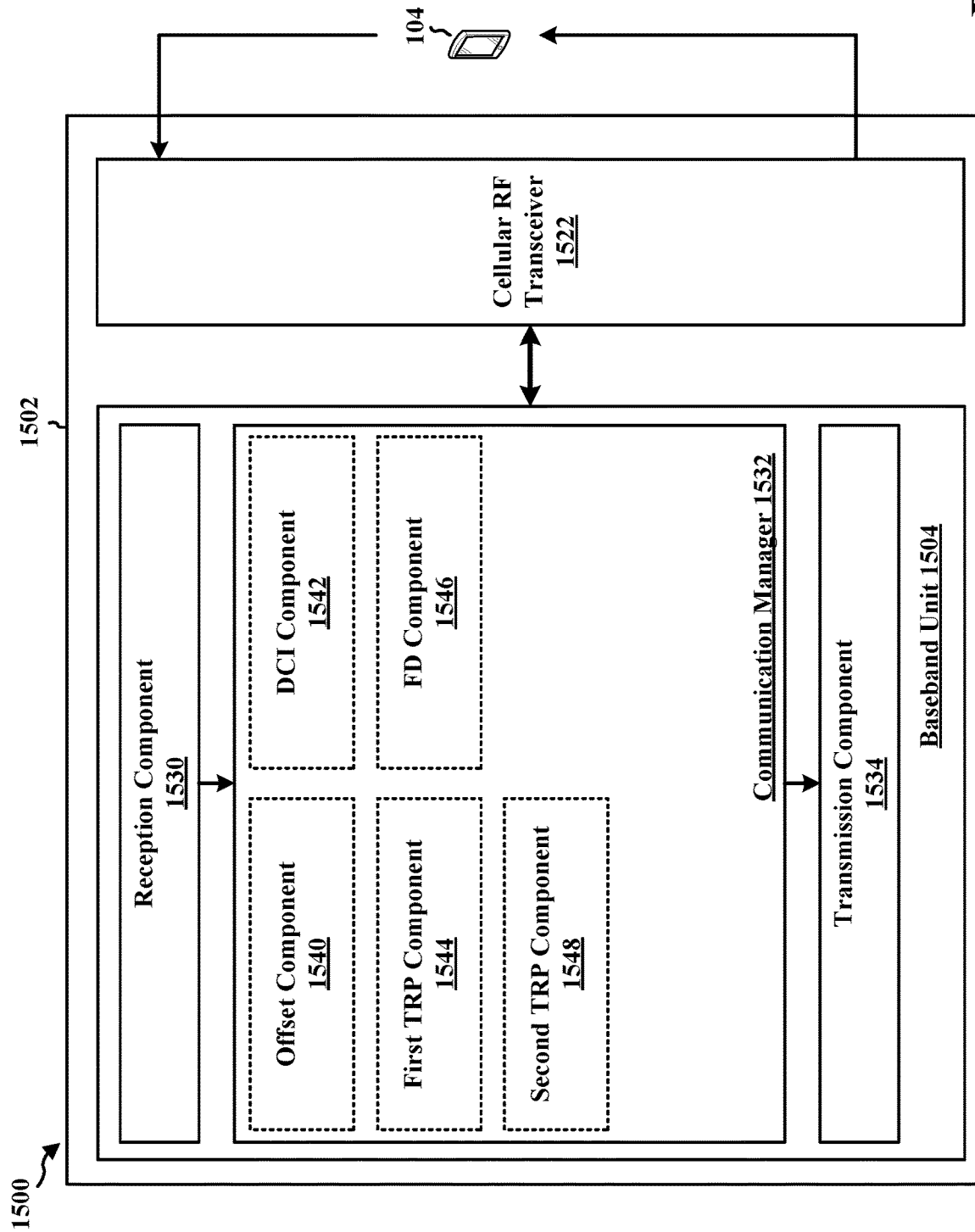
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes an offset component 1540 that may be configured to transmit, to the UE, a configuration of an offset in RRC signaling or in a MAC-CE, e.g., as described in connection with 1302 in FIG. 13. The communication manager 1532 further includes a DCI component 1542 that may be configured to transmit, to a UE, DCI from a first TRP scheduling a transmission of a TB from the first TRP and a second TRP, e.g., as described in connection with 1304 in FIG. 13. The communication manager 1532 further includes a first TRP component 1544 that may be configured to transmit, from the first TRP to the UE, a first set of CBGs of the TB in a first set of resources, e.g., as described in connection with 1306 in FIG. 13. The communication manager 1532 further includes an FD component 1546 that may be configured to receive, at the first TRP, from the UE in a full-duplex mode, a message, e.g., as described in connection with 1308 in FIG. 13. The communication manager 1532 further includes a second TRP component 1548 that may be configured to transmit, from the second TRP to the UE, a second set of CBGs of the TB in a second set of resources that is different than the first set of resources, e.g., as described in connection with 1310 in FIG. 13.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for transmitting, to a UE, DCI from a first TRP scheduling a transmission of a TB from the first TRP and a second TRP. The apparatus 1502 may include means for transmitting, from the first TRP to the UE, a first set of CBGs of the TB in a first set of resources. The apparatus 1502 may include means for transmitting, from the second TRP to the UE, a second set of CBGs of the TB in a second set of resources that is different than the first set of resources. The first set of CBGs may be transmitted based on a first MCS and the second set of CBGs may be transmitted based on a second MCS.

In one configuration, the first set of resources and the second set of resources may be frequency division multiplexed. In one configuration, the first set of CBGs may be mapped to first time-frequency resources associated with the first TRP, and the second set of CBGs may be mapped to second time-frequency resources associated with the second TRP. In one configuration, the first set of CBGs may be mapped first in frequency then in time in the first time-frequency resources associated with the first TRP, and the second set of CBGs may be mapped first in frequency then in time in the second time-frequency resources associated with the second TRP. In one configuration, the DCI may include a first indication of the first MCS and a second indication of the second MCS. In one configuration, the DCI may include an indication of the first MCS, and the apparatus 1502 may further include means for transmitting, to the UE, a configuration of an offset in RRC signaling or in a MAC-CE, where the second MCS may be based on the indication and the offset. In one configuration, the apparatus 1502 may further include means for receiving, at the first TRP, from the UE in a full-duplex mode, a message, the reception at the first TRP of the message from the UE overlapping in time with the transmission of the first set of CBGs from the first TRP to the UE, where the first MCS may be lower than the second MCS. In one configuration, the second MCS may have a same value as the first MCS if the DCI includes a single MCS indication. In one configuration, a TBS of the TB may be based at least in part on first time-frequency resources associated with the first TRP, second time-frequency resources associated with the second TRP, the first MCS, and the second MCS. In one configuration, the TBS of the TB may be based on a first size of the first set of CBGs and a second size of the second set of CBGs, the first size being determined based at least in part on the first time-frequency resources associated with the first TRP and the first MCS, the second size being determined based at least in part on the second time-frequency resources associated with the second TRP and the second MCS.

The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

According to aspects described above, a UE may receive DCI from a first TRP scheduling a transmission of a TB from the first TRP and a second TRP. The UE may receive, from the first TRP a first set of CBGs of the TB in a first set of resources. The UE may receive, from the second TRP a second set of CBGs of the TB in a second set of resources that is different than the first set of resources. The first set of CBGs may be received based on a first MCS and the second set of CBGs may be received based on a second MCS. By enabling the utilization of different MCS's for transmission from different TRPs to the UE, different channel conditions for the channels from the different TRPs to the UE may be accommodated, and communication efficiency improved. The aspects may be advantageous when the UE performs a full-duplex communication with one of the TRPs and thus suffers from self-interference in the reception from that TRP but not from other TRPs. In this case, a lower and thus more robust MCS may be utilized for the reception from the TRP that is in the full-duplex mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving DCI from a first TRP scheduling a transmission of a TB from the first TRP and a second TRP; receiving, from the first TRP a first set of CBGs of the TB in a first set of resources; and receiving, from the second TRP a second set of CBGs of the TB in a second set of resources that is different than the first set of resources, where the first set of CBGs are received based on a first MCS and the second set of CBGs are received based on a second MCS.

Aspect 2 is the method of aspect 1, where the first set of resources and the second set of resources are frequency division multiplexed.

Aspect 3 is the method of any of aspects 1 and 2, where the first set of CBGs are mapped to first time-frequency resources associated with the first TRP, and the second set of CBGs are mapped to second time-frequency resources associated with the second TRP.

Aspect 4 is the method of aspect 3, where the first set of CBGs are mapped first in frequency then in time in the first time-frequency resources associated with the first TRP, and the second set of CBGs are mapped first in frequency then in time in the second time-frequency resources associated with the second TRP.

Aspect 5 is the method of any of aspects 1 to 4, where the DCI includes a first indication of the first MCS and a second indication of the second MCS.

Aspect 6 is the method of any of aspects 1 to 4, where the DCI includes an indication of the first MCS, the method further including: receiving a configuration of an offset in RRC signaling or in a MAC-CE, where the second MCS is based on the indication and the offset.

Aspect 7 is the method of any of aspects 1 to 6, further including: transmitting, in a full-duplex mode, a message to the first TRP, the transmission of the message to the first TRP overlapping in time with the reception of the first set of CBGs from the first TRP, where the first MCS is lower than the second MCS.

Aspect 8 is the method of any of aspects 1 to 4 and 7, where the second MCS has a same value as the first MCS if the DCI includes a single MCS indication.

Aspect 9 is the method of any of aspects 1 to 8, where a TBS of the TB is based at least in part on first time-frequency resources associated with the first TRP, second time-frequency resources associated with the second TRP, the first MCS, and the second MCS.

Aspect 10 is the method of aspect 9, where the TBS of the TB is based on a first size of the first set of CBGs and a second size of the second set of CBGs, the first size being determined based at least in part on the first time-frequency resources associated with the first TRP and the first MCS, the second size being determined based at least in part on the second time-frequency resources associated with the second TRP and the second MCS.

Aspect 11 is a method of wireless communication at a serving cell, including: transmitting, to a UE, DCI from a first TRP scheduling a transmission of a TB from the first TRP and a second TRP; transmitting, from the first TRP to the UE, a first set of CBGs of the TB in a first set of resources; and transmitting, from the second TRP to the UE, a second set of CBGs of the TB in a second set of resources that is different than the first set of resources, where the first set of CBGs are transmitted based on a first MCS and the second set of CBGs are transmitted based on a second MCS.

Aspect 12 is the method of aspect 11, where the first set of resources and the second set of resources are frequency division multiplexed.

Aspect 13 is the method of any of aspects 11 and 12, where the first set of CBGs are mapped to first time-frequency resources associated with the first TRP, and the second set of CBGs are mapped to second time-frequency resources associated with the second TRP.

Aspect 14 is the method of aspect 3, where the first set of CBGs are mapped first in frequency then in time in the first time-frequency resources associated with the first TRP, and the second set of CBGs are mapped first in frequency then in time in the second time-frequency resources associated with the second TRP.

Aspect 15 is the method of any of aspects 11 to 14, where the DCI includes a first indication of the first MCS and a second indication of the second MCS.

Aspect 16 is the method of any of aspects 11 to 14, where the DCI includes an indication of the first MCS, the method further including: transmitting, to the UE, a configuration of an offset in RRC signaling or in a MAC-CE, where the second MCS is based on the indication and the offset.

Aspect 17 is the method of any of aspects 11 to 16, further including: receiving, at the first TRP, from the UE in a full-duplex mode, a message, the reception at the first TRP of the message from the UE overlapping in time with the transmission of the first set of CBGs from the first TRP to the UE, where the first MCS is lower than the second MCS.

Aspect 18 is the method of any of aspects 11 to 14 and 17, where the second MCS has a same value as the first MCS if the DCI includes a single MCS indication.

Aspect 19 is the method of any of aspects 11 to 18, where a TBS of the TB is based at least in part on first time-frequency resources associated with the first TRP, second time-frequency resources associated with the second TRP, the first MCS, and the second MCS.

Aspect 20 is the method of aspect 19, where the TBS of the TB is based on a first size of the first set of CBGs and a second size of the second set of CBGs, the first size being determined based at least in part on the first time-frequency resources associated with the first TRP and the first MCS, the second size being determined based at least in part on the second time-frequency resources associated with the second TRP and the second MCS.

Aspect 21 is an apparatus for wireless communication including at least one processor coupled to a memory and configured to implement a method as in any of aspects 1 to 20.

Aspect 22 is an apparatus for wireless communication including means for implementing a method as in any of aspects 1 to 20.

Aspect 23 is a computer-readable medium storing computer executable code, where the code when executed by a processor causes the processor to implement a method as in any of aspects 1 to 20.

What is claimed is:

1. An apparatus for wireless communication, comprising:
a memory; and
at least one processor coupled to the memory, wherein the at least one processor is configured to:
receive downlink control information (DCI) from a first transmission and reception point (TRP) scheduling a transmission of a transport block (TB) from the first TRP and a second TRP;
receive, from the first TRP, a first set of code block groups (CBGs) of the TB in a first set of resources; and
receive, from the second TRP, a second set of CBGs of the TB in a second set of resources that is different than the first set of resources,
wherein the first set of CBGs is based on a first modulation and coding scheme (MCS) and the second set of CBGs is based on a second MCS, wherein a transport block size (TBS) of the TB is based on a first size of the first set of CBGs and a second size of the second set of CBGs, wherein the first size is based on first time-frequency resources associated with the first TRP and the first MCS, and wherein the second size is based on second time-frequency resources associated with the second TRP and the second MCS.

2. The apparatus of claim 1, wherein the first set of resources and the second set of resources are frequency division multiplexed.

3. The apparatus of claim 1, wherein the first set of resources is associated with the first TRP, and the second set of resources is associated with the second TRP.

4. The apparatus of claim 1, wherein the DCI comprises a first indication of the first MCS and a second indication of the second MCS.

5. The apparatus of claim 1, wherein the DCI comprises an indication of the first MCS, wherein the at least one processor is configured to:
receive, in radio resource control (RRC) signaling or a medium access control (MAC)-control element (CE) (MAC-CE), a configuration of an offset, wherein the second MCS is based on the indication and the offset.

6. The apparatus of claim 1, wherein the at least one processor is configured to:
transmit, in a full-duplex mode, a message to the first TRP, the transmission of the message to the first TRP overlapping in time with the reception of the first set of CBGs from the first TRP, wherein the first MCS is lower than the second MCS.

7. The apparatus of claim 1, wherein the second MCS has a same value as the first MCS if the DCI comprises a single MCS indication.

8. A method of wireless communication performed by a user equipment (UE), comprising:
receiving downlink control information (DCI) from a first transmission and reception point (TRP) scheduling a transmission of a transport block (TB) from the first TRP and a second TRP;
receiving, from the first TRP, a first set of code block groups (CBGs) of the TB in a first set of resources; and
receiving, from the second TRP, a second set of CBGs of the TB in a second set of resources that is different than the first set of resources,
wherein the first set of CBGs are received based on a first modulation and coding scheme (MCS) and the second set of CBGs are received based on a second MCS, wherein a transport block size (TBS) of the TB is based on a first size of the first set of CBGs and a second size of the second set of CBGs, wherein the first size is based on first time-frequency resources associated with the first TRP and the first MCS, and wherein the second size is based on second time-frequency resources associated with the second TRP and the second MCS.

9. The method of claim 8, wherein the first set of resources and the second set of resources are frequency division multiplexed.

10. The method of claim 8, wherein the first set of resources is associated with the first TRP, and the second set of resources is associated with the second TRP.

11. The method of claim 8, wherein the DCI comprises a first indication of the first MCS and a second indication of the second MCS.

12. A serving cell for wireless communication, comprising:
a memory; and
at least one processor coupled to the memory, wherein the at least one processor is configured to:
transmit, to a user equipment (UE), downlink control information (DCI) from a first transmission and reception point (TRP) scheduling a transmission of a transport block (TB) from the first TRP and a second TRP;
transmit, from the first TRP to the UE based on a first modulation and coding scheme (MCS), a first set of code block groups (CBGs) of the TB in a first set of resources; and
transmit, from the second TRP to the UE based on a second MCS, a second set of CBGs of the TB in a second set of resources that is different than the first set of resources, wherein a transport block size (TBS) of the TB is based on a first size of the first set of CBGs and a second size of the second set of CBGs, wherein the first size is based on first time-frequency resources associated with the first TRP and the first MCS, and wherein the second size is based on second time-frequency resources associated with the second TRP and the second MCS.

13. The serving cell of claim 12, wherein the first set of resources and the second set of resources are frequency division multiplexed.

14. The serving cell of claim 12, wherein the first set of CBGs is mapped to first time-frequency resources associated with the first TRP, and the second set of CBGs is mapped to second time-frequency resources associated with the second TRP.

15. The serving cell of claim 14, wherein the first set of CBGs is mapped first in frequency then in time in the first time-frequency resources associated with the first TRP, and the second set of CBGs is mapped first in frequency then in time in the second time-frequency resources associated with the second TRP.

16. The serving cell of claim 12, wherein the DCI comprises a first indication of the first MCS and a second indication of the second MCS.

17. The serving cell of claim 12, wherein the DCI comprises an indication of the first MCS, wherein the at least one processor is further configured to:
transmit, to the UE in radio resource control (RRC) signaling or a medium access control (MAC)-control element (CE) (MAC-CE), a configuration of an offset, wherein the second MCS is based on the indication and the offset.

18. The serving cell of claim 12, wherein the at least one processor is configured to:
receive, at the first TRP, from the UE in a full-duplex mode, a message, the reception at the first TRP of the message from the UE overlapping in time with the transmission of the first set of CBGs from the first TRP to the UE, wherein the first MCS is lower than the second MCS.

19. The serving cell of claim 12, wherein the second MCS has a same value as the first MCS if the DCI comprises a single MCS indication.

20. A method of wireless communication performed by a serving cell, comprising:
transmitting, to a user equipment (UE), downlink control information (DCI) from a first transmission and reception point (TRP) scheduling a transmission of a transport block (TB) from the first TRP and a second TRP;
transmitting, from the first TRP to the UE based on a first modulation and coding scheme (MCS), a first set of code block groups (CBGs) of the TB in a first set of resources; and
transmitting, from the second TRP to the UE based on a second MCS, a second set of CBGs of the TB in a second set of resources that is different than the first set of resources, wherein a transport block size (TBS) of the TB is based on a first size of the first set of CBGs and a second size of the second set of CBGs, wherein the first size is based on first time-frequency resources associated with the first TRP and the first MCS, and wherein the second size is based on second time-frequency resources associated with the second TRP and the second MCS.

21. The method of claim 20, wherein the first set of resources and the second set of resources are frequency division multiplexed.

22. The method of claim 20, wherein the first set of CBGs is mapped to first time-frequency resources associated with the first TRP, and the second set of CBGs is mapped to second time-frequency resources associated with the second TRP.

23. The method of claim 22, wherein the first set of CBGs is mapped first in frequency then in time in the first time-frequency resources associated with the first TRP, and the second set of CBGs is mapped first in frequency then in time in the second time-frequency resources associated with the second TRP.

24. The method of claim 20, wherein the DCI comprises a first indication of the first MCS and a second indication of the second MCS.

* * * * *